United States Patent
Siebenmorgen et al.

(10) Patent No.: US 11,300,770 B2
(45) Date of Patent: Apr. 12, 2022

(54) INCLINATION MEASUREMENT AND CORRECTION OF THE COVER GLASS IN THE OPTICAL PATH OF A MICROSCOPE

(71) Applicant: Carl Zeiss Microscopy GmbH, Jena (DE)

(72) Inventors: Jörg Siebenmorgen, Jena (DE); Thomas Kalkbrenner, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 634 days.

(21) Appl. No.: 16/312,517

(22) PCT Filed: Jun. 29, 2017

(86) PCT No.: PCT/EP2017/066135
§ 371 (c)(1),
(2) Date: Dec. 21, 2018

(87) PCT Pub. No.: WO2018/002224
PCT Pub. Date: Jan. 4, 2018

(65) Prior Publication Data
US 2019/0339505 A1    Nov. 7, 2019

(30) Foreign Application Priority Data

Jul. 1, 2016    (DE) .................. 10 2016 212 019.0

(51) Int. Cl.
*G02B 21/26*  (2006.01)
*G02B 21/00*  (2006.01)

(52) U.S. Cl.
CPC .......... *G02B 21/26* (2013.01); *G02B 21/008* (2013.01); *G02B 21/0032* (2013.01); *G02B 21/0036* (2013.01); *G02B 21/0088* (2013.01)

(58) Field of Classification Search
CPC .............. G02B 21/26; G02B 21/0032; G02B 21/0036; G02B 21/008; G02B 21/0088;
(Continued)

(56) References Cited

U.S. PATENT DOCUMENTS 3,305,294 A    2/1967   Alvarez
6,677,565 B1   1/2004   Wahl et al.
(Continued)

FOREIGN PATENT DOCUMENTS

DE    102007017598 A1    10/2008
DE    102007046601 A1    4/2009
(Continued)

OTHER PUBLICATIONS

International Search Report with Written Opinion dated Jan. 30, 2018 and English Translation.
(Continued)

*Primary Examiner* — Stephone B Allen
*Assistant Examiner* — Rahman Abdur
(74) *Attorney, Agent, or Firm* — Duane Morris LLP

(57) ABSTRACT

A method for adjusting a specimen holder in the beam path of a microscope, in which at least one beam of an illumination radiation is directed onto the specimen holder; a component of the illumination radiation reflected by the specimen holder is captured by means of a detector and measurement values of the captured illumination radiation are ascertained. A current actual manner of positioning of the specimen holder in relation to the beam path is established depending on the measurement values; the established actual manner of positioning is compared to an intended manner of positioning, and control commands for modifying the actual manner of positioning are produced, the execution of which causes the specimen holder to be moved into the intended manner of positioning.

8 Claims, 11 Drawing Sheets

(58) Field of Classification Search
CPC . G02B 21/244; G02B 21/0076; G02B 21/361
USPC .................................. 359/368, 369, 372, 385
See application file for complete search history.

(56) References Cited

U.S. PATENT DOCUMENTS

| | | | |
|---|---|---|---|
| 2004/0257675 A1* | 12/2004 | Holderer | G02B 27/62 |
| | | | 359/754 |
| 2006/0098213 A1 | 5/2006 | Itoh et al. | |
| 2008/0111911 A1* | 5/2008 | Kawanabe | H04N 5/232121 |
| | | | 348/345 |
| 2009/0152440 A1 | 6/2009 | Altendorf et al. | |
| 2012/0097835 A1* | 4/2012 | Sharonov | G01B 11/026 |
| | | | 250/201.3 |
| 2012/0327208 A1 | 12/2012 | Higaki et al. | |
| 2015/0330776 A1* | 11/2015 | Hayashi | G02B 21/34 |
| | | | 356/138 |
| 2015/0362713 A1* | 12/2015 | Betzig | G02B 21/0076 |
| | | | 250/459.1 |
| 2016/0048967 A1 | 2/2016 | Mitzkus et al. | |
| 2016/0070091 A1* | 3/2016 | Hufnagel | G02B 21/06 |
| | | | 359/385 |
| 2016/0084714 A1 | 3/2016 | Zhu et al. | |
| 2016/0291304 A1* | 10/2016 | Singer | G02B 13/18 |
| 2016/0349495 A1* | 12/2016 | Pretorius | G02B 27/0025 |
| 2017/0293130 A1* | 10/2017 | Huang | G02B 21/0088 |

FOREIGN PATENT DOCUMENTS

| | | |
|---|---|---|
| DE | 102008007178 A1 | 8/2009 |
| DE | 102011003807 A1 | 8/2012 |
| DE | 102011084562 A1 | 4/2013 |
| DE | 102013107297 A1 | 1/2015 |
| DE | 102014102215 A1 | 8/2015 |
| DE | 202016008115 U1 | 3/2017 |
| EP | 1970746 A1 | 9/2008 |
| EP | 1988417 A1 | 11/2008 |
| WO | 2010135323 A1 | 11/2010 |
| WO | 2012110488 A2 | 8/2012 |
| WO | 2018002224 A2 | 1/2018 |

OTHER PUBLICATIONS

German Search Report dated Jun. 2, 2017.
McGorty, et al; "Open-top selective plane illumination microscope for conventionally mounted specimens"; Optics Express 2015; 23(12):16142-16153.
Gutierrez-Vega, J.C., et al.; "Experimental demonstration of optical Mathieu beams"; Optics Communications 2001; 195:35-40.
Notification of Transmittal of Translation of the International Preliminary Report on Patentability, International Preliminary Report on Patentability, and Written Opinion of the International Searching Authority dated Jan. 10, 2019.

* cited by examiner

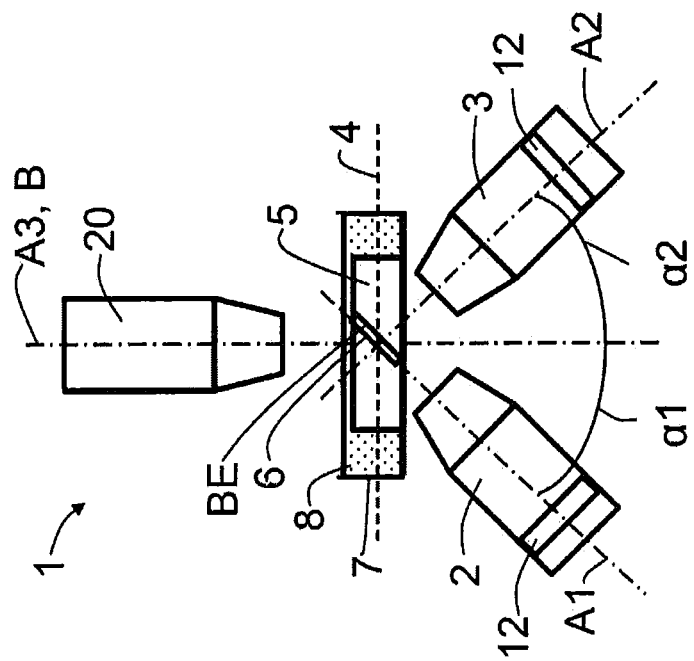
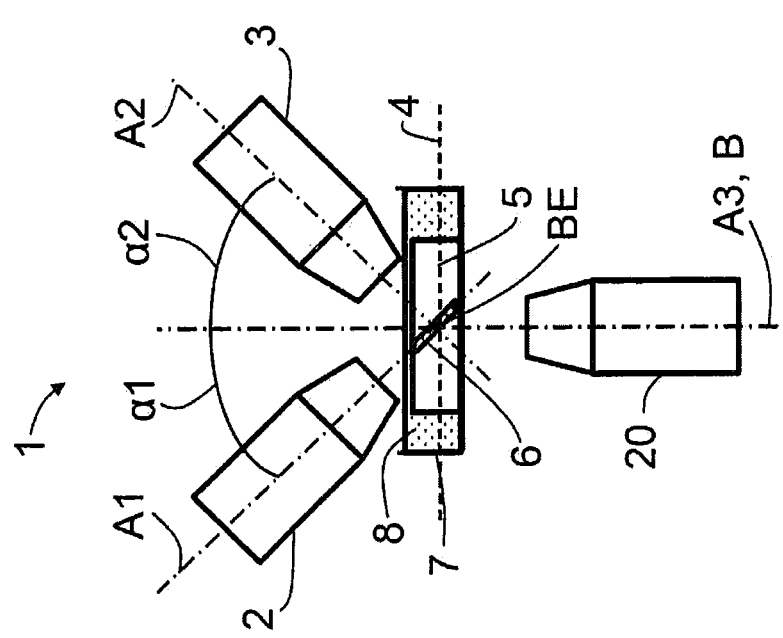
Fig. 1a
Prior art
Fig. 1b
Prior art

INCLINATION MEASUREMENT AND CORRECTION OF THE COVER GLASS IN THE OPTICAL PATH OF A MICROSCOPE

RELATED APPLICATIONS

The present application is a U.S. National Stage application of International PCT Application No. PCT/EP2017/0066135 filed on Jun. 29, 2017 which claims priority benefit of German Application No. DE 10 2016 212 019.0 filed on Jul. 1, 2016, the contents of each are incorporated by reference in their entirety.

FIELD OF THE INVENTION

The invention relates to a method for adjusting a specimen holder in the beam path of a microscope.

BACKGROUND OF THE INVENTION

One of the main applications of light sheet microscopy lies in imaging midsized specimens, for example organisms, with dimensions of several 100 µm up to a few millimeters. As a rule, these specimens are embedded in agarose and arranged in a glass capillary. For the purposes of examining the specimen, the glass capillary is introduced into a water-filled specimen chamber and the agarose with the specimen is pressed a little out of the capillary. The specimen is illuminated by a light sheet. The fluorescence that is excited in the specimen and that emanates from the latter is imaged onto a detector, in particular a camera, by means of a detection objective, which is perpendicular to the light sheet and consequently also perpendicular to the light sheet optical unit.

In accordance with the prior art, a layout of a microscope 1 for light sheet microscopy (SPIM layout; single plane illumination microscopy) comprises an illumination objective 2 and a detection objective 3 (also referred to as SPIM objectives below) which are each directed onto the specimen plane 4 from above at an angle of 45° in relation to a specimen plane 4 and at right angles in relation to one another (see FIG. 1a). A specimen 5 arranged in the specimen plane 4 is situated, for example, on the base of a specimen holder 7 embodied as a petri dish. The specimen holder 7 is filled with a liquid 8, for example water, and the two SPIM objectives 2, 3 are immersed in the liquid 8 during the application of the light sheet microscopy (not shown). The specimen plane 4 extends in a plane XY spanned by the X-axis X and the Y-axis Y of a Cartesian coordinate system. The first optical axis A1 and the second optical axis A2 extend in a plane YZ spanned by the Y-axis Y and the Z-axis Z of the Cartesian coordinate system.

This approach offers the advantage of a high resolution in the axial direction since a thin light sheet 6 may be produced by means of the illumination objective 2. Smaller specimens 5 may be examined on account of the higher resolution. Additionally, the bothersome background fluorescence is significantly reduced and the signal-to-noise ratio is improved as a result thereof.

In accordance with the prior art, an overview image parallel to the specimen plane 4 and to the specimen holder 7 is produced by virtue of a wide-field image being recorded perpendicular through the transparent base of the specimen holder 7 by means of a wide-field objective 20 situated below the specimen 5. Transmitted light illumination of the specimen 5 and capturing the transmitted light is not possible here as the two SPIM objectives 2, 3 are arranged too tightly next to one another.

In order to facilitate simpler specimen preparation in standard specimen containers such as e.g. multiwell plates, it is possible to maintain the 45° configuration but have the two SPIM objectives 2, 3, in an inverse arrangement, be directed into the specimen plane 4 from below through the transparent base of the specimen holder 7 (FIG. 1b). In this arrangement, it is necessary to correct the aberrations caused by the specimen holder 7 which is inclined relative to the optical axes A1 and A2 and present in the form of a cover slip by using special optical elements. The specimen 5 arranged in the specimen plane 4 is illuminated through the base of the specimen holder 7 and excited fluorescence of the specimen 5 is detected. It is possible to use specimen holders 7 such as e.g. multiwell plates, Petri dishes and/or object supports and contamination of the specimens 5, in particular in the case of high-throughput screening, may be avoided.

Further technical difficulties occur if, e.g., Alvarez plates 12 (FIG. 1b) are arranged in the beam path of the illumination objective 2 and/or of the detection objective 3 (U.S. Pat. No. 3,305,294 A). The Alvarez plates 12 are embodied in such a way that they correct aberrations that may occur, precisely in the case of a set angle between the specimen holder 7, e.g., a cover slip, and the optical axes A1, A2 of the respective objective 2, 3. Unwanted aberrations that lead to a lower imaging quality already occur in the case of a small deviation of the angle (e.g., <0.1°). Therefore, the cover slip, for example, must be aligned before the start of an experiment so that the angle deviation lies within the admissible tolerances. Moreover, it is helpful if the distance between the objective 2, 3, or a possibly present additional lens (e.g., a meniscus lens), and the cover slip is also adjustable in addition to the angle such that the specimen 5, or the region thereof to be imaged, lies in the image plane BE of the detection objective 3.

DE 10 2007 046 601 A1 discloses an apparatus for adjusting a lamp in a reflected light system. At least one aperture stop is arranged in a reflected light illumination beam path in said reflected light system. A detector is arranged in a detection beam path of the reflected light system. The reflected light illumination beam path and the detection beam path extend together and in parallel in a portion of the reflected light system. An optical element is positionable in the portion of the reflected light system, with the optical element imaging the aperture stop onto the detector.

DE 10 2008 007 178 A1 relates to a calibration apparatus of a laser scanning microscope, having securely aligned to one another in a common frame a focusing optical unit and a test structure arranged in the focal plane of the focusing optical unit, said test structure having structure elements that are detectable in reflected light and/or transmitted light. In the microscope, the test structure is switchable into the microscope beam path in such a way that the pupil of the focusing optical unit coincides with the objective pupil of the laser scanning microscope or said pupil lies in a plane conjugate thereto.

A possibility for correcting aberrations of a microscope caused by a cover slip is known from the publication by McGorty et al. (2015: Open-top selective plane illumination microscope for conventionally mounted specimens; OPTICS EXPRESS 23: 16142-16153). The inverted SPIM microscope has a water prism, by the effect of which aberrations occurring as a consequence of the oblique passage of the detection light through the cover slip are partly compensated.

SUMMARY OF THE INVENTION

The invention is based on the object of proposing a method for adjusting a specimen holder in the beam path of a microscope.

The object is achieved by the subject matter of the independent claim 1. Advantageous configurations are specified in the dependent claims.

The object is achieved by a method for adjusting a specimen holder in the beam path of a microscope, in which at least one beam of an illumination radiation is directed onto the specimen holder. A component of the illumination radiation reflected by the specimen holder is captured by means of a detector and measurement values of the captured illumination radiation are ascertained. A current actual manner of positioning, also referred to as actual position below, of the specimen holder in relation to the beam path is established depending on these measurement values. The established actual manner of positioning is compared to an intended manner of positioning, also referred to as intended position below, and control commands for modifying the actual manner of positioning are produced, the execution of which causes the specimen holder to be moved into the intended manner of positioning.

The core of the invention consists in the use of a reflected component (reflection) of the illumination radiation to undertake an adjustment of the specimen holder, for example a cover slip, in respect of its relative angle position and its distance in respect of the beam path.

Components of the illumination radiation are usually reflected at the upper and lower sides of cover slips, for example. Reflections at these interfaces usually occur with a reflectance of approximately 3% in each case. Here, the reflected component of the illumination radiation usually lies virtually completely within the detection NA. A consequence of this is that the reflected component can be largely imaged on a detector that is optically connected to the detection objective. This reflected component can now be used to undertake an adjustment of the cover slip in relation to angle and distance.

An actual manner of positioning need not be established in absolute terms, for example in the form of coordinates of an independent coordinate system. In configurations of the method, an actual position can also be established in the form of relative position relationships in relation to the beam path.

The intended manner of positioning is reached when the specimen holder assumes an expected or desired manner of positioning. It is possible to determine an admissible tolerance of the intended manner of positioning.

The illumination radiation is provided and directed onto the specimen holder as at least one beam of individual rays (beam). Here, in various configurations of the method according to the invention, the illumination radiation can be a radiation with self-reconstructing beams or non-diffractive beams and it can be embodied, for example, in the form of a Gaussian beam, a Bessel beam, Mathieu beam, $sinc^3$ beam, a lattice light sheet, a coherent Bessel beam, a sectioned Bessel beam or an Airy beam and can be directed onto the specimen holder.

A Mathieu beam can be considered to be a propagation-invariant optical field according to the Helmholtz equation with elliptic coordinates (Gutierrez-Vega, J. C. et al, 2001: Experimental demonstration of optical Mathieu beams; Optics Communications 195: 35-40).

In further configurations of the method, the illumination radiation in the form of a light sheet is directed onto the specimen holder. Here, in one configuration of the method, the light sheet can be produced with illumination radiation of a wavelength that differs from the wavelength of an illumination radiation used for the imaging. This advantageously reduces an impairment of the image quality and it is possible to reduce a bleaching effect of the illumination radiation on the specimen by way of a targeted selection of the wavelength used to produce the light sheet and of the intensity thereof.

Thus, it is possible to use different illumination radiations in order, for example, to carry out different partial steps of the method according to the invention.

A microscope that is embodied as an inverted microscope is used in an advantageous configuration of the method. The inverted microscope comprises an illumination objective with a first optical axis, wherein the first optical axis penetrates a specimen plane that is spanned by an X-axis and a Y-axis that is orthogonal to the X-axis. Furthermore, a detection objective with a second optical axis, embodied to detect light coming from the specimen plane, is present, wherein the illumination objective and the detection objective are aligned in such a way in relation to one another and in relation to the specimen plane that the first optical axis and the second optical axis intersect in the specimen plane and include a substantially right angle therebetween. The first optical axis and the second optical axis each include an angle that differs from zero with a third axis that is directed orthogonally to the specimen plane in the direction of a Z-axis and that serves as a reference axis.

The configuration specified above is particularly suitable for light sheet microscopy.

In a possible configuration of the method, the latter includes two steps. Below, the actual relative position and intended relative position refer to the relative positions of the image of the reflected component on the detector, in particular on a detection surface of the detector.

In a step 1, the specimen holder, which has a base with a first side face and a second side face that is transparent to the illumination radiation, is displaced in the direction of the Z-axis until the component of the illumination radiation reflected by the first side face, e.g., the upper side, of the base is captured. The relative position between the specimen holder and the detector is modified in relation to one another in such a way that an actual relative position of the captured component approximates an intended relative position on the detector. The intended relative position advantageously is centrally on the detector surface in order to largely avoid an actual relative position of the reflected component being outside of the detector surface when adjusting the intended relative position.

By way of example, the base can be the base of a dish, for example made of glass or plastic. It is also possible that a cover slip with its first and second side face is a base within the aforementioned sense. A sufficient transparency of the material of the base to the illumination radiation or the illumination radiations, and the first side face and second side face, which act as interfaces at which refractions and/or reflections of the illumination radiation can be implemented, are of importance here.

In a step 2, the presence of a tilt of the first side face of the base about the X-axis is checked by virtue of establishing an angle deviation of the actual relative position from the intended relative position. If an angle deviation that is greater than an admissible angle deviation is determined here, the specimen holder is rotated about the X-axis until the angle deviation is minimized. Optionally, it is possible to establish a preferred rotational direction for compensating the tilt in order, for example, to compensate the angle deviation by way of the shortest rotational path. Subsequently, an occurrence of a deviation of the intended position from the actual position in the direction of the Z-axis is checked. If an inadmissible deviation occurs, step 1 and, optionally, step 2 is/are repeated. After step 2, the specimen holder is aligned parallel to the X-axis.

Optionally, an alignment of the first side face in the direction of the Y-axis is checked in a step 3 by virtue of the specimen holder being displaced in the direction of the Y-axis and a deviation from the direction of the Y-axis being determined by a migration of the captured reflected component on the detector. If migration, i.e., of the actual relative position, of the captured reflected component occurs, the specimen holder is rotated about the X-axis until no more migration occurs or until the latter lies within an admissible tolerance limit.

In a further configuration of the method, the adjusted specimen holder is displaced from a first (intended) manner of positioning, in which a component reflected by the first side face is captured in a first intended relative position, in the direction of the Z-axis until the image of the captured reflected component reaches a second intended relative position, in which a component that is reflected from the second side face, for example the lower side, of the base is captured. An actual distance between the first and second side face from one another in the direction of the Z-axis is established depending on the displacement path in the direction of the Z-axis traveled between the first intended relative position and the second intended relative position. The distance established thus corresponds to the thickness of the base.

The distance or the thickness of the base can be calculated. A calculation option is specified below in the context of the exemplary embodiments.

The reflected component is captured to capture by means of a detector, for example by means of a camera, for example comprising a CCD or CMOS chip, or by means of a four-quadrant diode.

Conventional microscope systems are understood to be both reflected light and transmitted light microscopes with a below-type embodiment (inverted arrangement) or with objectives arranged above the specimen plane.

In a further possible configuration of the method, the illumination radiation is directed onto the specimen holder by means of an autocollimation telescope and the actual manner of positioning (inclination) of the specimen holder is established depending on a deviation of an actual relative position of the captured reflected component on the detector from an intended relative position of the captured reflected component on the detector.

An inclination angle of the specimen holder is established depending on the established deviation. If the established inclination angle is greater than an admissible tolerance of the inclination angle, the actual manner of positioning of the specimen holder is modified in order to set an inclination angle within the admissible tolerance by virtue of appropriate control commands being generated and executed.

This configuration of the method is suitable for both inverted and upright microscopes.

Further, it is possible for radiation of a collimated laser to be directed as illumination radiation onto the specimen holder in a manner parallel to the perpendicular and for an occurring reflection to be mirrored-out and captured. A four-quadrant diode can be used for capturing purposes.

A further possible configuration of the method is characterized in that an image quality measure is defined, an actual manner of positioning of the specimen holder is modified, e.g., step-by-step (iteratively), and measurement values of the image quality measure or measurement values of the captured reflected components are captured assigned to each of the chosen actual manners of positioning.

A current value of the image quality measure is established in each case on the basis of the measurement values of the image quality measure or the measurement values of the captured reflected components and an actual manner of positioning, in which a desired, e.g., maximum or maximized, image quality measure is present, is selected.

The selected actual manner of positioning can be set as future intended manner of positioning.

The measurement values of the image quality measure or the measurement values of the captured reflected components can be derived, for example, from the specimen holder (and)/or a beam profile of the illumination radiation. This configuration is suitable for inverted microscope systems.

Further, a reflection of the illumination radiation can be used in a method in which a topography of the specimen holder, in particular a topography of the first and/or second side face, is established, wherein relative height values are established at at least three points, also referred to as measurement points below, of the specimen holder and the actual manner of positioning (inclination) of the specimen holder is established depending on the established height values.

The topography is determined by relative heights, determined from measured points on the surface of the specimen holder, which are specified by relative height values. By way of example, the relative heights are specified in the form of coordinates in the direction of the Z-axis.

The topography can be determined by means of various variants.

By way of example, the use of an interferometer is possible. Here, the illumination radiation is directed onto the specimen holder by means of a (fiber) interferometer and the actual manner of positioning of the specimen holder is established depending on a deviation of an actual relative position of the captured reflected component on the detector from an intended relative position of the captured reflected component on the detector.

Furthermore, an image of the specimen holder can be produced and image quality values of at least one image quality measure can be established at at least three image points in a further variant. Height values corresponding to the three image points are established depending on the image quality values.

The topography can also be established by triangulation. To this end, a measurement point is captured from at least two observation points that differ from one another. A measurement point is a point to be measured on a surface of the specimen holder. The respective observation angle, at which the observed measurement point lies from the respective observation point, is established and an actual manner of positioning of the measurement point is established depending on the observation points and the associated observation angles. The actual manner of positioning of the specimen holder is established depending on the actual manner of positioning of the at least one measurement point. At least three measurement points are measured.

The invention relates to an option for adjusting the specimen holder, for example for measuring the inclination and correcting the inclination of the cover slip, in particular in the case of SPIM. Advantageously, the method according to the invention for the light sheet microscopy is employable using an inverted microscope equipped with a detection objective and an illumination objective, which are perpendicular to one another and each respectively illuminate and detect at an angle through a cover slip from below.

Particularly in the case of microscopes with an inverted arrangement and inclined beam paths, the inclination measurement and, where necessary, an inclination correction are indispensable since significant aberrations already occur in the case of very small inclinations.

Advantageously, the method according to the invention is also for microscopes with a perpendicular alignment of a beam path or of the beam paths. Although the aberrations in such a conventional arrangement are also smaller, these aberrations are of great importance to the imaging quality of modern objectives with large numerical apertures, in particular for water-immersion objectives or TIRF objectives.

BRIEF DESCRIPTIONS OF THE DRAWINGS

The invention is explained in more detail below on the basis of exemplary embodiments and figures. In the figures:

FIG. 1a is a schematic illustration of a microscope with a 45° arrangement of the illumination objective and detection objective above a specimen plane and with a wide-field objective below a specimen plane, in accordance with the prior art;

FIG. 1b is a schematic illustration of a microscope with an inverted 45° arrangement of the illumination objective and detection objective below a specimen plane and with a wide-field objective above a specimen plane, in accordance with the prior art;

DETAILED DESCRIPTION OF THE EMBODIMENTS

Figure 2:
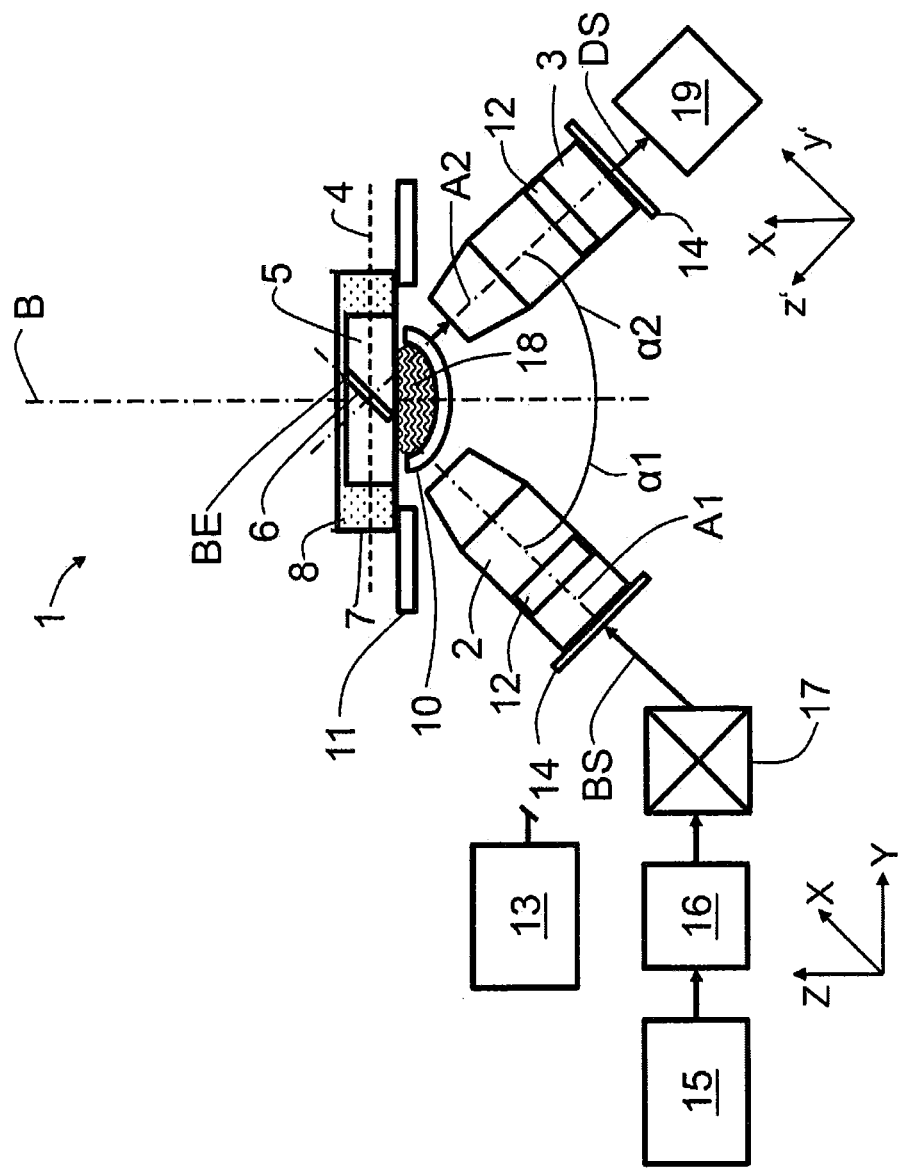
FIG. 2 is a schematic illustration of one exemplary embodiment of a microscope embodied for light sheet microscopy, having Alvarez plates and a meniscus lens.

In the following schematic illustrations of examples from the prior art and exemplary embodiments of the invention, the same reference signs denote the same elements.

An upright microscope 1, as depicted schematically in FIG. 1a, comprising an illumination objective 2, a detection objective 3 and a wide-field objective 20 is known from the prior art. A light sheet 6 is produced or producible along a first optical axis A1 by means of the illumination objective 2, said light sheet being usable to examine a specimen 5 arranged in a specimen plane 4. The detection objective 3 has a second optical axis A2, along which light coming from the specimen plane 4 may be captured. The first optical axis A1 and the second optical axis A2 are aligned orthogonal to one another and each include an angle of 45° with the specimen plane 4 which serves as a reference plane.

The wide-field objective 20 has a third optical axis A3, which is directed orthogonally to the specimen plane 4 and serves as a reference axis B. The first to third optical axes A1 to A3 intersect in the region of extent of the light sheet 6 in the specimen 5. Moreover, the first optical axis A1 includes a first angle α1 with the reference axis B and the second optical axis A2 includes a second angle α2 of 90°−α1 with the reference axis B, e.g. respectively 45°.

The specimen 5 is held in a specimen holder 7 which is situated on a specimen stage 11 and filled with a liquid 8.

FIG. 1b schematically shows a microscope 1 with an inverted arrangement of illumination objective 2 and detection objective 3, in which the illumination objective 2 and the detection objective 3 are arranged below the specimen plane 20 and the wide-field objective 20 is arranged above the specimen plane 20. Once again, the angles α1 and α2 are 45° in each case.

The following exemplary embodiments are illustrated in an exemplary manner on the basis of inverted microscopes 1 and may, in further embodiments, also be embodied as upright microscopes 1.

An exemplary embodiment of an inverted microscope 1, embodied for light sheet microscopy and comprising Alvarez plates 12 and a meniscus lens 10, is illustrated in FIG. 2. The angles α1 and α2 are 45° in each case. The Alvarez plates 12 serve to correct aberrations which may occur on account of the oblique passage of the illumination radiation BS through the base of the specimen holder 7. The meniscus lens 10 assists the transition of the illumination radiation BS from air into an immersion medium 18 and into the liquid 8 and, for a detection radiation DS, the transition from the liquid 8 into the immersion medium 18 and into the air.

The specimen holder 7 is held on the specimen stage 11. The specimen stage 11 itself is adjustable in a controlled fashion in an XY-plane, spanned by the X-axis X and the Y-axis Y, by means of drives that are not illustrated in any more detail.

The illumination objective 2 and the detection objective 3 are each adjustable in a controlled fashion along the first optical axis A1 and along the second optical axis A2, respectively, by means of an objective drive 14, which is embodied as a piezo-drive in this case.

The illumination radiation BS is provided by a laser module 15 and shaped by means of a beam-shaping unit 16. The beam shaping 16 is, e.g., an optical unit, by means of which the provided illumination radiation BS is collimated, for example.

A scanner 17 is present downstream of the beam-shaping unit 16, the shaped illumination radiation BS being deflectable in a controlled fashion in two directions by means of said scanner (XY scanner).

Downstream of the scanner, the illumination objective 2 is arranged on the first optical axis A1. The illumination radiation BS that is deflected by the scanner 17 reaches the illumination objective 2 and it is shaped and/or focused by the latter.

The detection radiation DS is directed onto a detector 19 along the second optical axis A2 and able to be captured by said detector.

A control unit 13 is present for the purposes of actuating the specimen stage 11, the piezo-drives 14, the Alvarez plates 12, the laser module 15, the beam shaping 16, the scanner 17 and/or the detector 19, said control unit being linked to the elements to be actuated in a connection suitable for data transmission.

In further embodiments, the control unit 13 is additionally configured to capture, store and/or evaluate measurement values. Further elements and units of the microscope 1 may be actuatable by means of the control unit 13 and/or measurement values can be obtained and evaluated thereby.

For description purposes, two coordinate systems with mutually orthogonal axes are used below. The first coordinate system is the coordinate system of the entire arrangement with an X-axis X, a Y-axis Y and a Z-axis Z. Ideally, the specimen holder 7, in particular the base thereof, is aligned parallel to an XY-plane that is spanned by the X-axis X and the Y-axis Y. The second coordinate system is the coordinate system of the detector 19 with the X-axis X, a y-axis y' and a z-axis z'. Imaging of, for example, an image from the image plane BE onto the detector 19 has the coordinates X and y'. The X-axis X is identical in both coordinate systems and directed in orthogonal fashion to the plane of the drawing of the figures. The two other axes Y and y' and Z and z', respectively, can be superposed on one another by way of a rotation about the X-axis X.

Figure 3:
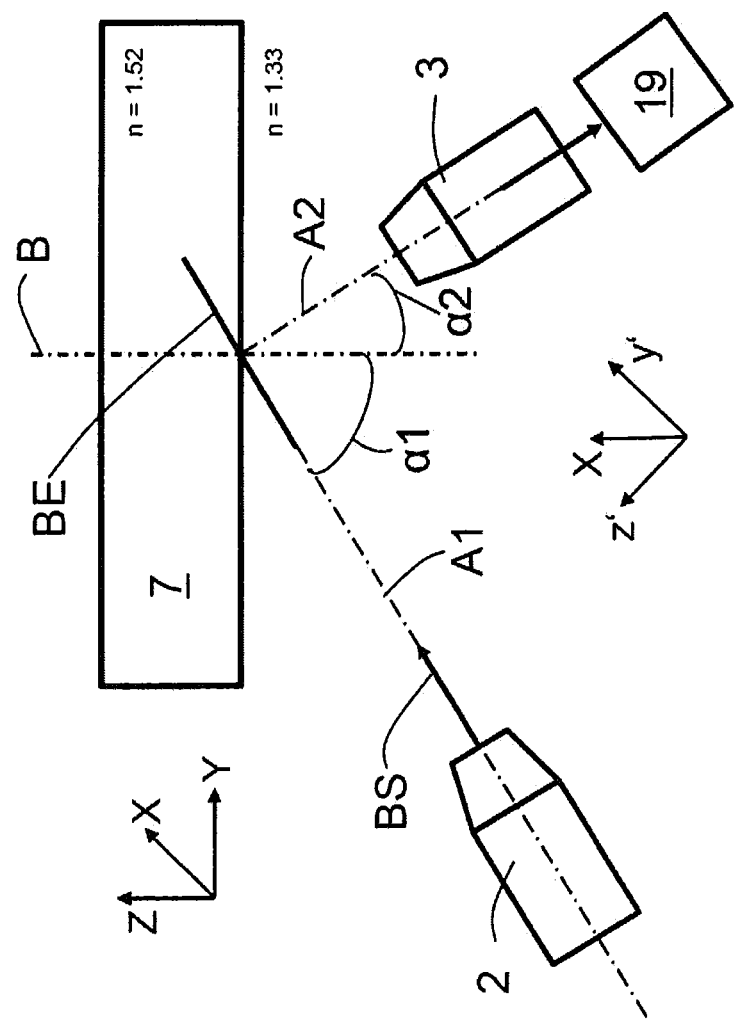
FIG. 3 is a schematic illustration of one exemplary embodiment of an inverted light sheet microscope.

The following exemplary embodiments are based, in exemplary fashion, on an inverted light sheet microscope, in which the first optical axis A1 of the illumination objective 2 includes an angle α1 of 60° in relation to the reference axis B and the second optical axis A2 of the detection objective 3 includes an angle α2 of 30° (FIG. 3). For improved clarity, an optional meniscus lens 10 has not been illustrated in all the drawings. Moreover, a refractive index of n=1.52 is taken as a basis for the specimen holder 7, for example in the form of a cover slip or the base of the specimen holder 7, and a refractive index n=1.33 is taken as a basis for water as an immersion medium 18.

Figure 4:
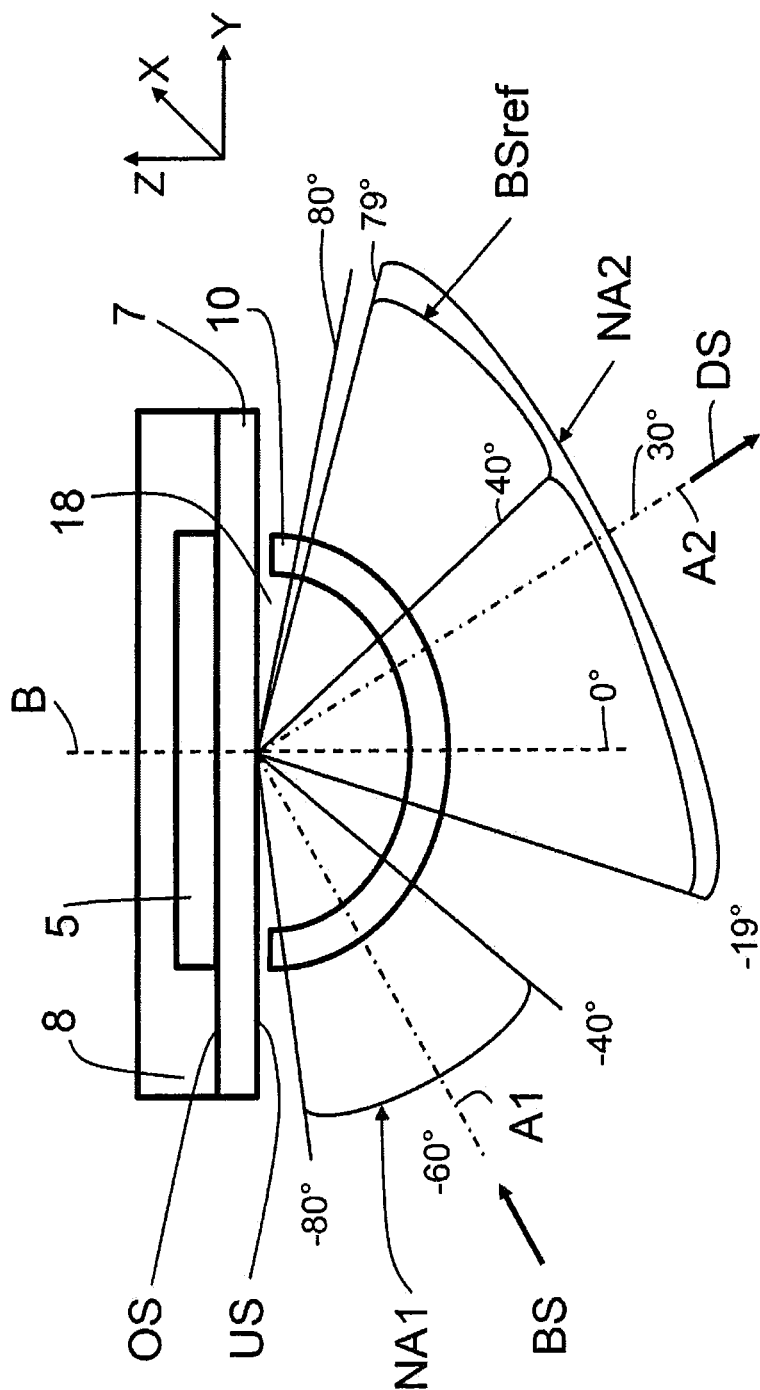
FIG. 4 is a schematic illustration of a schematic sketch of the reflection and aperture relationships on a specimen holder of an inverted microscope.

In FIG. 4, numerical apertures NA1, NA2 are shown as aperture angles of the illumination objective 2 and of the detection objective 3, respectively. The illumination objective 2 has a numerical aperture NA1 of 0.45 while the detection objective 3 has a numerical aperture NA2 of 1.0. For reasons of clarity, the illustration is not true to scale.

The reference axis B extends at an angle of 0°. The first optical axis A1 extends at an angle α1 of −60°. The first numerical aperture NA1 spans a cone from −40° to −80°. The second optical axis A2 extends at an angle α2 of 30°. The second numerical aperture NA2 spans a cone from −19° to 79°.

The material of the specimen holder 7 is transparent to the illumination radiation BS. A component of the illumination radiation BSref is reflected at the interface between the immersion medium 18 and the specimen holder 7, and at the interface between the specimen holder 7 and the specimen 5. The reflectance is approximately 3% in each case. The illumination cone formed by the reflected component of the illumination radiation BSref reaches from 40° to 80° and lies virtually completely within the second numerical aperture NA2 of the detection objective 3. This renders it possible to virtually completely image the reflected component of the illumination radiation BSref (=reflection BSref) on the detector 19 (see FIGS. 2, 3 and 5). The reflection BSref can be used to undertake an actual manner of positioning of the specimen holder 7 and to undertake an adjustment of the specimen holder 7 depending on the established current actual manner of positioning.

Figure 5:
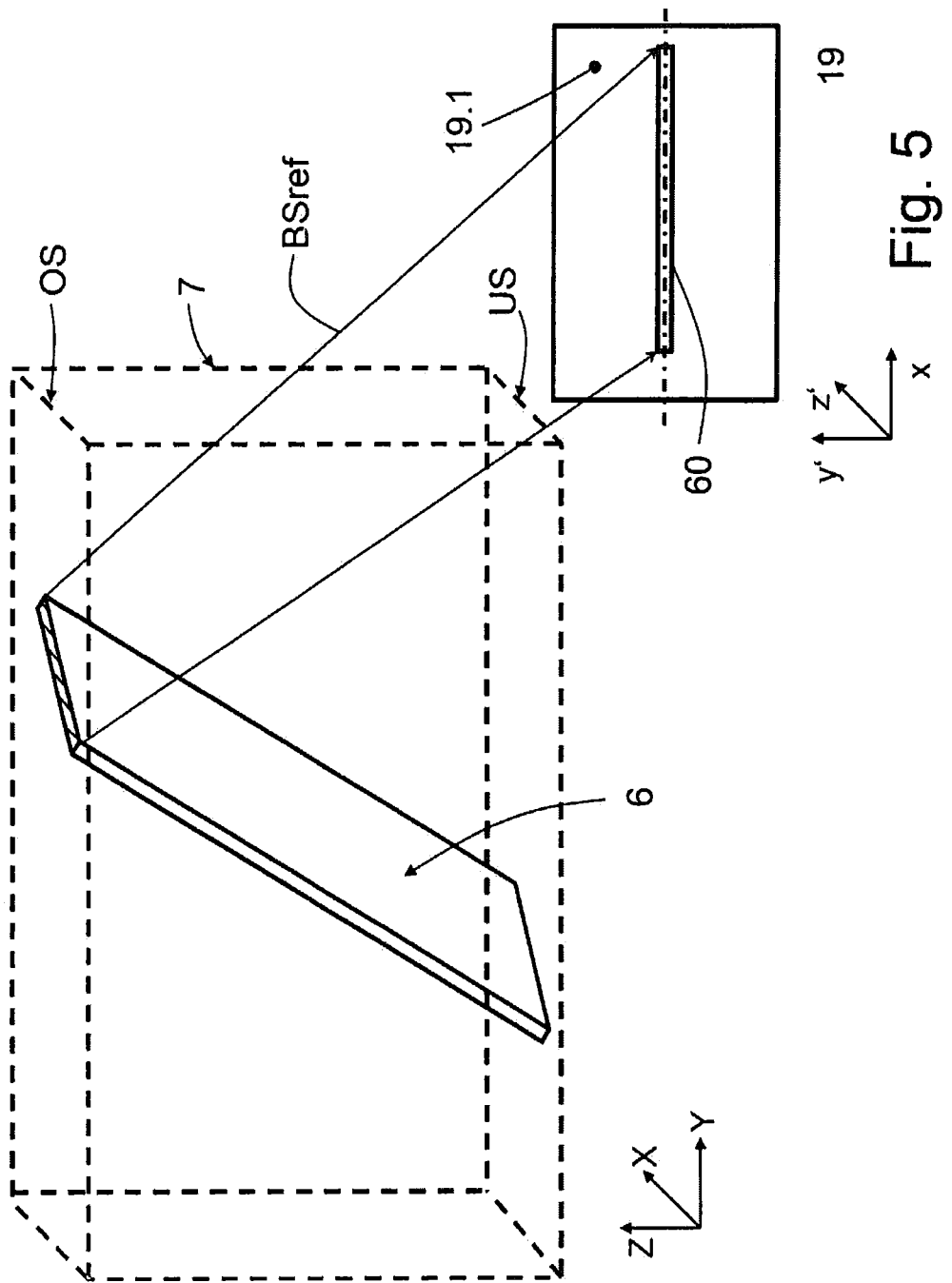
FIG. 5 is a schematic illustration of the relative position of a light sheet in a specimen and an image of a reflected component of the light sheet on a detector.

In order to elucidate the transformation of the reflection BSref from the coordinate system of the entire arrangement into the coordinate system of the detector 19, FIG. 5 schematically shows the outline of a specimen holder 7, for example a cover slip. The light sheet 6 has already been formed in the specimen holder 7. With its cross section, the light sheet 6 is incident on an upper side as a first side face OS of the specimen holder 7, at which a component of the light sheet 6, i.e., a component of the illumination radiation 3, is reflected and steered as reflection BSref through a lower side as a second side face US of the specimen holder 7 onto the detector surface 19.1 of a detector 19 and imaged there as image 60 of the light sheet cross section.

In FIG. 5, the detector surface 19.1 is illustrated in a plan view, while the specimen holder 7 and the light sheet 6 are illustrated in a lateral view. The illustrated orientation of the coordinate system of the detector 19 with the axes X, y' and z' emerges from these views that are rotated in relation to one another.

The embodiment of the method according to the invention and possible configurations are described on the basis of FIGS. 6 to 9.

Figure 6:
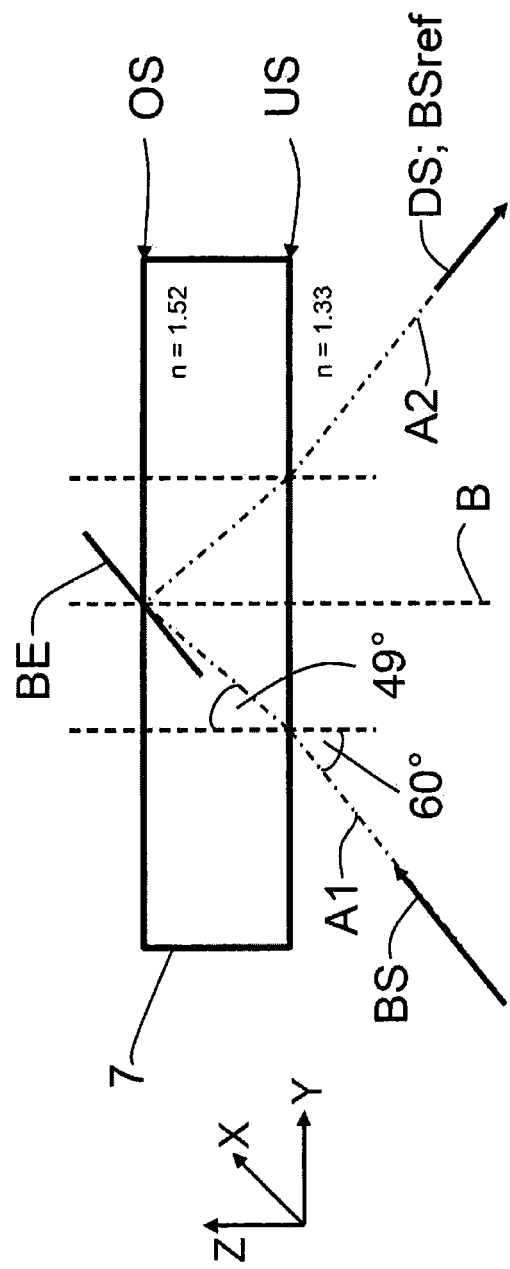
FIG. 6 is a schematic illustration of the reflection of an illumination radiation at the upper side of a specimen holder.

An exemplary beam path of the illumination radiation BS and of the detection radiation DS is illustrated in FIG. 6. The illumination radiation BS is directed onto the lower side US of the specimen holder 7 along the first optical axis A1 at an angle of 60° to the perpendicular. When the illumination radiation BS passes through the interface, formed by the lower side US, between air with a refractive index n=1.33 and the material of the specimen holder 7 with a refractive index n=1.52, the illumination radiation BS is refracted toward the perpendicular and it runs at an angle of 48° to the upper side OS of the specimen holder 7.

The component of the illumination radiation BSref is reflected back to the second side face US at the first side face OS in an image plane BE (see also FIG. 5). When the reflected component of the illumination radiation BSref passes through the second side face US, it is refracted away from the perpendicular again and it reaches, for example, the detector 19 (not shown) along the second optical axis A2 as detection radiation DS.

In order to adjust the specimen holder 7, the specimen holder 7 is displaced in the direction of the Z-axis (Z) in a step 1, until the component of the illumination radiation BSref that is reflected from the first side face OS, from the upper side in the illustrated exemplary embodiment, is captured. Here, the assumption is made that the image plane BE is fixed. A relative position of the specimen holder 7 and the detector 19 in relation to one another is changed in such a way that an actual relative position of the component of the illumination radiation BSref, captured as an image 60, approximates an intended relative position of the image 60 on the detector surface 19.1 of the detector 19 (FIG. 7).

The actual position of the specimen holder 7 in the direction of the Z-axis Z is optimally adjusted when the image 60 of the cross section of the light sheet 6 lies centrally on the detector surface 19.1.

Since there is a reflection BSref from both the first side face OS and the second side face US of the cover slip, it is necessary to be able to distinguish between these. If the specimen holder 7 is moved in a positive direction (upward in FIG. 6) along the Z-axis Z, it is possible to initially position the reflection BSref at the first side face OS centrally on the detector surface 19.1. The reflection BSref caused by the second side face US can only be adjusted centrally in the case of a further displacement in the positive direction along the Z-axis Z.

Figure 7:
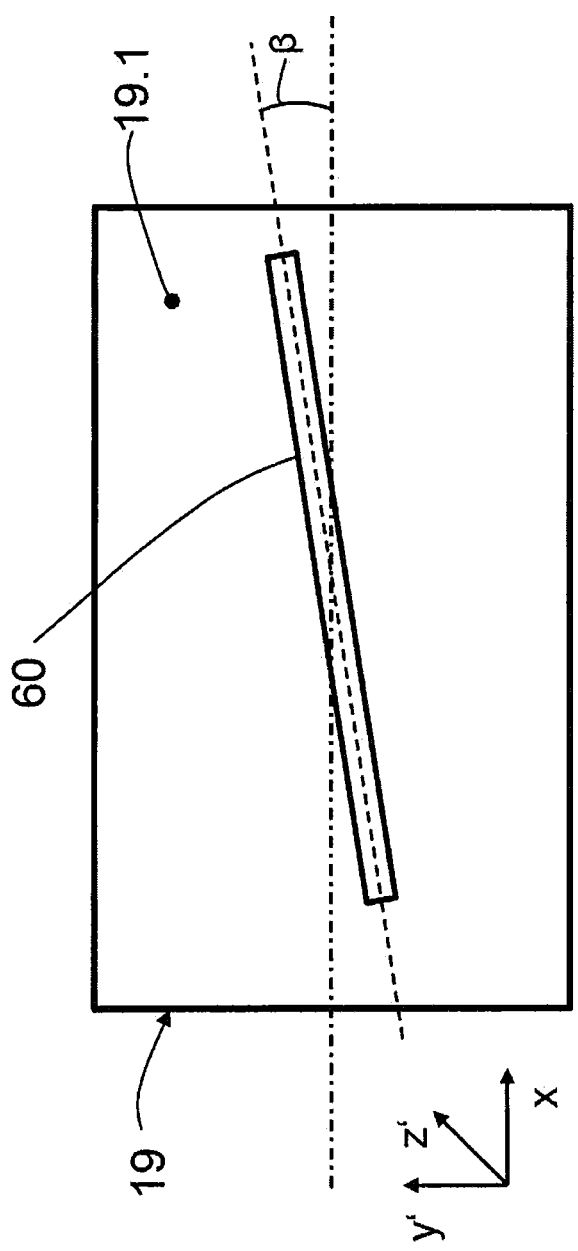
FIG. 7 is a schematic illustration of a tilted image of a reflected component of the illumination radiation on a detector.

If the cross section of the light sheet 7 is adjusted centrally, the image 60 emerges imaged centrally on the detector surface 19, as illustrated schematically in FIG. 7.

In a step 2, the presence of a tilt of the first side face about the Y-axis is checked by virtue of establishing an angle deviation of the actual relative position from the intended relative position. In FIG. 7, the intended relative position is shown in exemplary fashion by way of a dash-dotted line extending horizontally over the detector surface 19.1. A longitudinal axis of the image 60 should entirely coincide or virtually coincide with the horizontal dash-dotted line when the intended relative position is reached. In the example illustrated in FIG. 7, the longitudinal axis of the image 60 is tilted by an angle β in relation to the intended relative position. The current actual relative position of the image 60 deviates from the intended relative position.

If an angle deviation that is greater than an admissible angle deviation is determined, the specimen holder 7 is rotated about the Y-axis Y until the angle β is minimized.

Subsequently, a check is carried out as to whether a deviation of the intended position from the actual position in the direction of the Z-axis Z has taken place. Should an inadmissible deviation of the actual position in the direction of the Z-axis Z be present, for example on account of the correction of the angle deviation, the above-described first step 1 is repeated. The specimen now lies parallel to the X-axis.

In an optional step 3, the specimen holder 7, in particular the first side face OS, is additionally also aligned parallel to the Y-axis Y. To this end, the specimen holder 7 is displaced along the Y-axis Y, as is shown schematically in FIG. 8. If the specimen holder 7, in particular the first side face OS, is not aligned parallel to the Y axis Y, there is a displacement of the image 60 of the light sheet cross section in the y'-direction on the detector surface 19.1.

Figure 8:
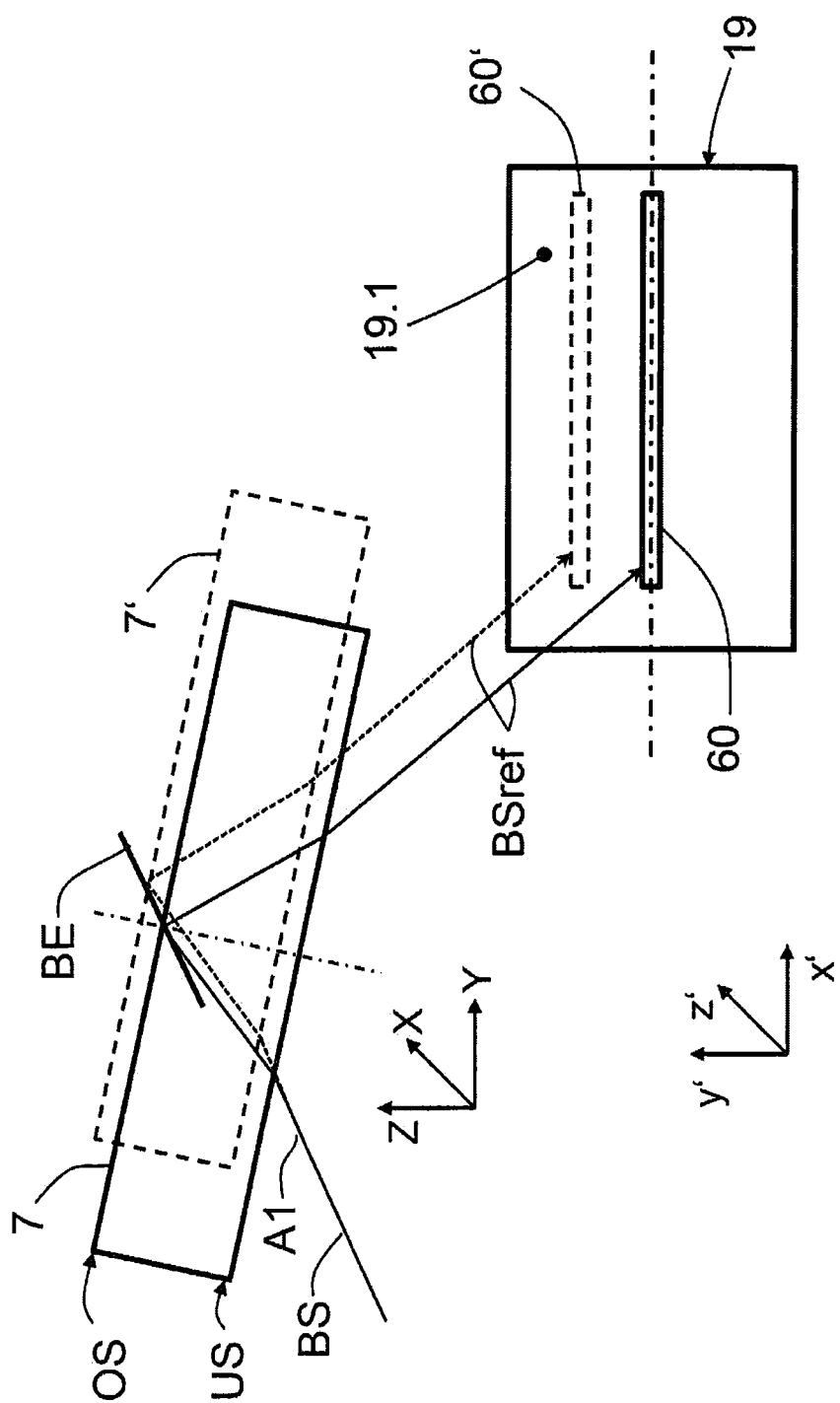
FIG. 8 is a schematic illustration of the principle of adjusting the specimen holder parallel to the Y-axis.
Figure 9:
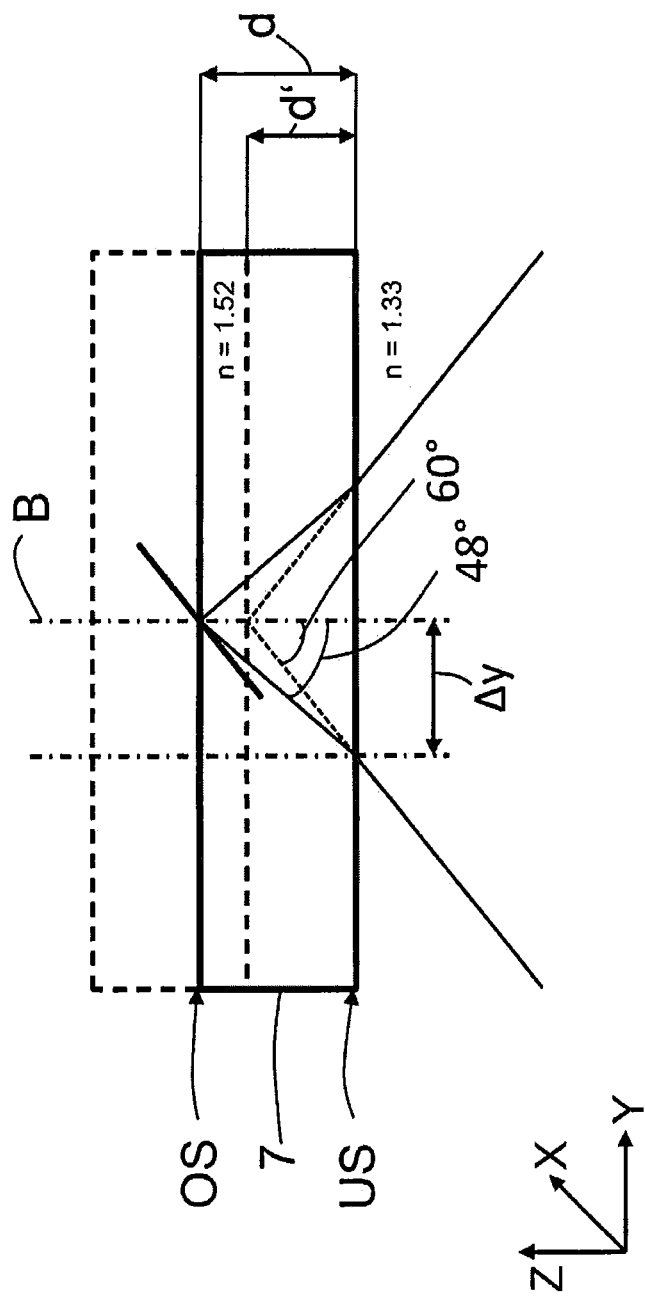
FIG. 9 is a schematic illustration of the principle of determining the thickness of the specimen holder.

FIG. 8 illustrates the specimen holder 7 in a current actual position and the associated image 60 on the detector surface 19.1 using solid lines. An actual position of a virtually displaced specimen holder 7' and an associated virtual image 60' of the light sheet cross section of the virtually displaced specimen holder 7' are shown in FIG. 8, framed by dashed lines. The same applies to the respectively associated beam paths of illumination radiation BS and reflected component of the illumination radiation BSref.

The first optical axis A1 remains stationary during the displacement process. As a result, the first side face OS of the displaced specimen holder 7' is offset by an amount in the direction of the Z-axis Z, which is why the image 60' of the displaced specimen holder 7' is incident with an offset in the direction of the y'-axis y' on the detector surface 19.1.

The alignment of the first side face OS in the direction of the Y-axis Y is checked by virtue of the specimen holder 7 being displaced in the direction of the Y-axis Y. If a deviation from the direction of the Y-axis Y is determined by a migration of the captured reflected component BSref on the detector 19, in particular on the detector surface 19.1, the specimen holder 7 is rotated about the X-axis X by means of controlled drives of the specimen stage 11, for example, until no migration occurs any more or migration occurs within an admissible tolerance limit.

By tilting the specimen holder 7 about the X-axis X, the latter is now aligned in such a way that no migration of the image 60 of the light sheet cross section occurs in the direction of the y'-axis y' during the displacement thereof in the direction of the Y-axis Y. If there is an inadmissible displacement of the specimen holder 7 in the direction of the Z-axis Z in the process, step 1 is repeated.

The above-described adjustment of the specimen holder 7 can be complemented by determining the thickness d, for example of the base of the specimen holder 7. Below, for the sake of simplification, reference is made to the thickness d of the base of a specimen holder 7 or to the thickness d of a cover slip used as a specimen holder 7.

Aberrations that occur during an oblique passage of the illumination radiation BS through the specimen holder 7 dependent on the thickness d thereof. For this reason, the Alvarez plates 12 (FIG. 2), for example, are displaceably mounted in the illumination objective 2 and/or the detection objective 3, in order to match an aberration correction to the thickness d by displacing the Alvarez plates 12 in relation to one another.

The thickness d of the specimen holder 7 can be determined on the basis of the reflections BSref from the first and second side face OS, US. The two reflections BSref are illustrated schematically in FIG. 9, with d being the thickness of the cover slip and d' being the displacement of the cover slip in the positive direction along the Z-axis Z.

The thickness d is determined as follows:

First, the specimen holder 7 is set in such a way that the reflection BSref from the first side face OS lies in the intended relative position, for example centrally, on the detector surface 19.1 as image 60 (see FIG. 5, 7, 8) and the specimen holder 7 has no inclination. The angle between the illumination radiation BS and the reference axis B is 48° in the example. The reference axis B extends through the image plane BE and through the point of incidence, illustrated in a simplified fashion, of the illumination radiation BS on the first side face OS. In the direction of the Y-axis Y, Δy denotes a path between the passage point of the illumination radiation BS through the second side face US and a point of incidence on the first side face US.

Then, the specimen holder 7 is displaced in the positive direction along the Z-axis Z until the reflection BSref from the second side face US lies in the intended relative position on the detector surface 19.1 as an image 60. The displacement path d' required to this end is established, for example measured or calculated. The angle between the illumination radiation BS and the reference axis B now is 60° in the example.

The thickness d can now be calculated by means of the following trigonometric relationships and the angles specified in the example:

$$\tan(60°) = \Delta y / d'$$

$$\tan(48°) = \Delta y / d$$

where Δy denotes the path between the passage of the illumination radiation BS and the reference axis B, measured in the direction of the X-axis X.

The thickness d is calculated from d' *))tan(60°/tan(48°).

In further configurations of the method, there can be an additional or alternative correction of the inclination by virtue of a light sheet 6 being produced with a wavelengths that is not used for imaging, for example infrared. This light sheet 6 can be used to check the actual position of the specimen holder 7, in particular the actual position thereof in the direction of the Z-axis Z, on a permanent basis or at certain times, for example during an experiment, and optionally to correct said actual position during the experiment. It is also possible to use a beam, for example a Gaussian beam, a Bessel beam or a Mathieu beam, instead of a light sheet 6. A four-quadrant diode can be used as a detector 19.

In further possible configurations, an autocollimation telescope can be directed onto the specimen holder 7. An oblique position of the specimen holder 7 is converted into a displacement of the reflection BSref on the detector 19 of the autocollimation telescope. It is only possible to adjust the inclination angle using this approach.

A further possible configuration requires a collimated laser, which is directed onto the specimen holder 7. The laser is aligned parallel to the perpendicular, for example to the reference axis B. By way of example, the reflection BSref is mirrored-out by means of a beam splitter or a pole optical unit and it is registered on a four-quadrant diode. Now, the inclination of the specimen holder 7 can be set and corrected with the aid of the signal of the four-quadrant diode. It is not possible to set the actual position in the direction of the Z-axis Z using this configuration. The two aforementioned methods are suitable for conventional microscope systems and light sheet microscopes.

Further, it is possible to additionally undertake an evaluation according to an image quality measure in a further configuration of the method. Thus, the inclination and/or the focal position of the detection objective 3 can be adjusted iteratively in order to bring measurement values of the chosen image quality measure to desired measurement values or in order to maximize said measurement values, for example. To this end, use can be made of the specimen 5 to be measured itself, or the beam profile of a beam of the chosen illumination radiation BS is analyzed.

It is possible, by all means, that the parameter space, which needs be checked iteratively, is too large or that the system cannot be iteratively optimized toward the global minimum, for example, an optimal inclination of the specimen holder 7 and an optimal focus position, and remains in a local minimum instead. Therefore, it is advantageous if the method of image quality evaluation is carried out in combination with one of the aforementioned configurations of the method. Here, the inclination of the specimen holder 7 and the actual position in the direction of the Z-axis Z are initially set approximately by means of one of the above-described methods. Subsequently, a fine adjustment is carried out by means of an image quality evaluation. This method is not suitable for conventional microscope systems.

Figure 10:
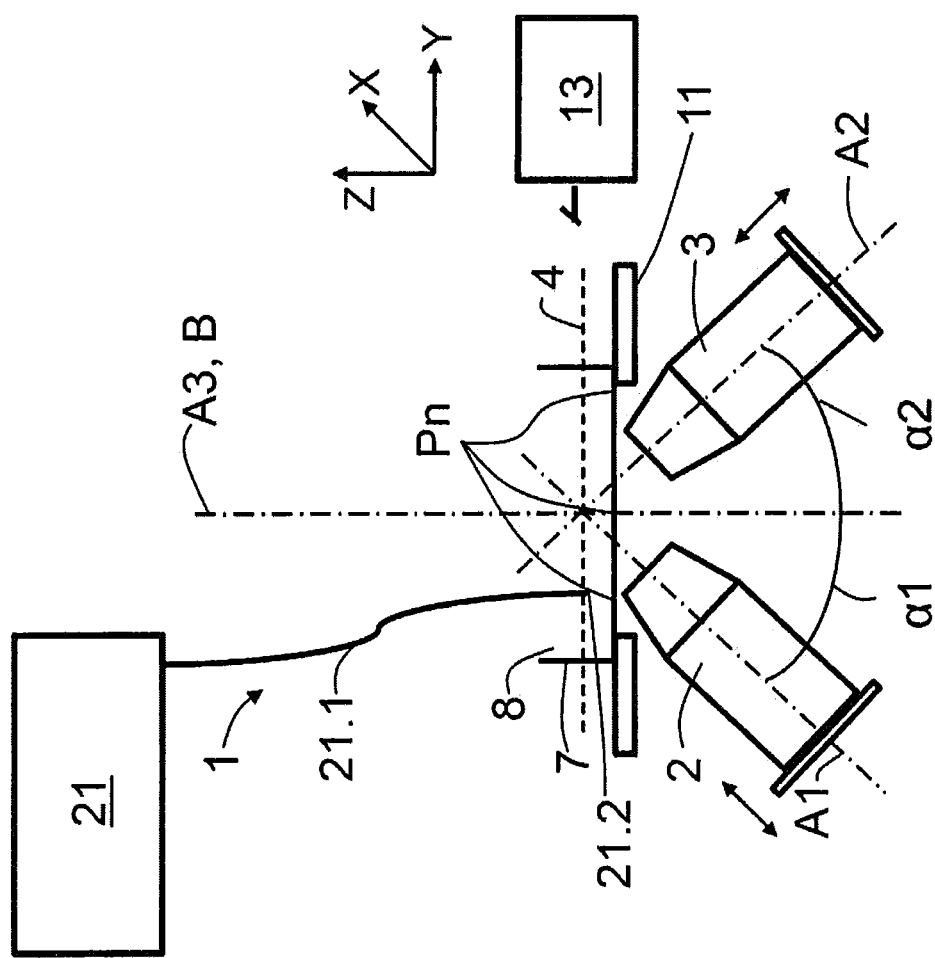
FIG. 10 is a schematic illustration of an arrangement for establishing the topography of the specimen holder by means of an interferometer.
Figure 11:
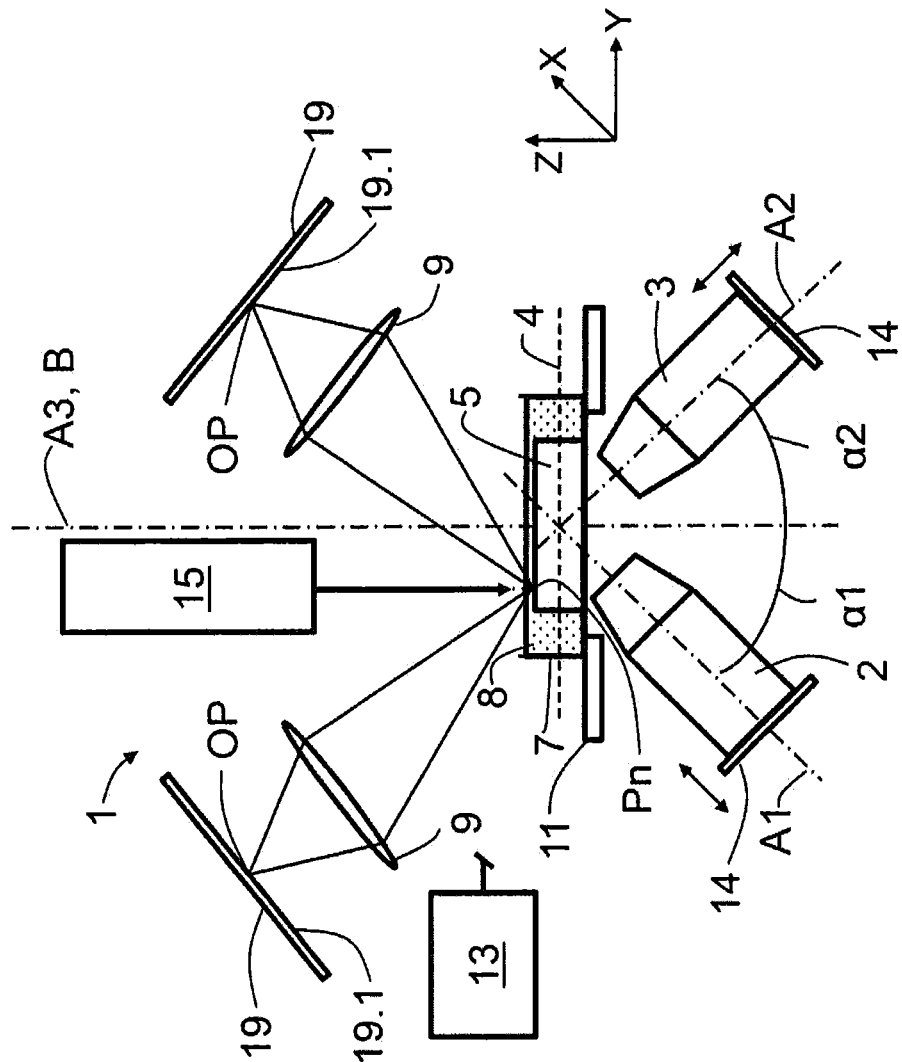
FIG. 11 is a schematic illustration of an arrangement for establishing the topography of the specimen holder by means of triangulation.

FIGS. 10 and 11 schematically illustrate exemplary embodiments of arrangements by means of which it is possible to capture the topography of the specimen holder 7.

In order to capture the topography, the topography, which corresponds to a relative height of the specimen holder 7 at the respective measurement point Pn, is captured at at least three measurement points Pn on a region of the specimen holder 7. The relative height is captured as a relative height value. The inclination of the specimen holder 7 can be established on the basis of the captured relative height values.

The topography can be established by means of an interferometer 21 that is embodied by way of example as a fiber interferometer. A suitable arrangement is shown in much simplified fashion in FIG. 10. In the microscope 1 in an inverted arrangement, the specimen holder 7 is situated on the specimen stage 11. A light-guiding fiber 21.1 of the interferometer 21 is directed at a measurement point Pn of the upper side OS of the base of the specimen holder 7. A radiation is directed or directable onto the measurement point Pn through a fiber emergence surface 21.2 by means of the fiber 21.1. The reflections occurring at the specimen holder 7 and the fiber emergence surface 21.2 both arise at glass/air-transitions and are comparable, and so an interference signal with a high modulation depth is obtained or can be obtained.

In further embodiments, the fiber 21.1 can be brought to the specimen holder 7 between the objectives 2, 3 or with a lateral offset to the latter.

At least one of the measured measurement points Pn can lie in the field of view of the microscope 1 in order to capture a local cover slip inclination. The interferometer 21 can also be positioned at another location and, after the topography measurement, the specimen holder 7 can be displaced into the observation position according to FIG. 10 by means of the specimen stage 11 that can be moved by means of a drive.

Fiber interferometers can also be used in parallelized fashion, i.e., a plurality of fibers 21.1 are arranged and operated in parallel such that a larger region of the specimen holder 7 can be measured at the same time.

In the case of an inverted arrangement, use can also be made of a conventional wide field interferometer.

The topography measurement method is suitable for both conventional microscope systems and light sheet microscopes.

In a further possible embodiment, the topography of the specimen 5 is determined by measuring the sharpness or another image quality criterion of the supported specimen 5 at at least three points and by appropriately adjusting the distances of at least one of the objectives 2, 3 from the specimen 5, and the local cover slip inclination is calculated therefrom.

In further possible configurations, nanoparticles (so-called fiducials) lying on the specimen holder 7 or markings applied to the specimen holder 7 can act as specimens 5.

This method, also referred to as sharpness measurement, is suitable for both conventional microscope systems and light sheet microscopes.

A further method for measuring the topography is explained on the basis of FIG. 11, in which an arrangement for establishing the topography of the specimen holder by means of triangulation is illustrated schematically.

In order to carry out the triangulation, a measurement point Pn is illuminated by means of a laser radiation of a laser module 15 and it is targeted from at least two mutually different observation points OP, i.e., from at least two different directions. The observation angles, at which the respective measurement point Pn can be targeted from a certain observation point OP, are established.

In FIG. 11, points on the respective detector surfaces 19.1 of detectors 19, on which the relevant measurement point Pn is imaged by means of an imaging optical unit 9, are represented in exemplary fashion as observation points OP.

Since the relative positions of the observation points OP are known and the observation angles were established, it is possible to establish the coordinates of an actual manner of positioning of the measurement point Pn in two dimensions and/or three dimensions depending on the observation points OP and the associated observation angles. In a further step, an actual manner of positioning of the specimen holder 7 is established by means of the control unit 13 depending on the actual manner of positioning of the measurement points Pn.

For the illustrated case of measuring the topography for determining the inclination along an axis, only the z-coordinate of the measurement point Pn is of importance here, and so an arrangement with an interferometer 21 with two measurement points Pn, which are aligned in a plane perpendicular to the specimen plane 4, suffices.

Three measurement points Pn are required if the relative position of the specimen holder 7 is intended to be established in space.

This method is suitable for both conventional microscope systems and light sheet microscopes.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1 Microscope
2 Illumination objective
3 Detection objective
4 Specimen plane
5 Specimen
6 Light sheet
60 Image (imaging/image of the light sheet cross section)
60' Image (of the light sheet cross section in the case of a displaced specimen holder 7')
BS Illumination radiation
BSref Reflected component (of the illumination radiation BS)
DS Detection radiation
BE Image plane
7 Specimen holder
7' Virtually displaced specimen holder 7
8 Liquid
9 Imaging optics
B Reference axis
10 Meniscus lens
11 Specimen stage
12 Alvarez plates
13 Control unit
14 Objective drive
15 Laser module
16 Beam shaping
17 XY-scanner
18 Immersion medium
19 Detector
19.1 Detector surface
20 Wide-field objective
21 Interferometer
21.1 Fiber
21.2 Fiber emergence surface
NA1 Numerical aperture (of the illumination objective 2)
NA2 Numerical aperture (of the detection objective 3)
A1 First optical axis
A2 Second optical axis
A3 Third optical axis
$\alpha 1$ Angle (between first optical axis A1 and third optical axis A3)
$\alpha 2$ Angle (between second optical axis A2 and third optical axis A3)
d Distance, thickness
d' Displacement path
OS First side face; upper side
US Second side face; lower side
Pn n-th measurement point
Angle $\beta$ Angle between actual relative position and intended relative position
OP Observation point
$\Delta y$ Path (in the direction of the Y-axis Y)

What is claimed is:

1. A method for adjusting a specimen holder in the beam path of a microscope, in which at least one beam of an illumination radiation is directed onto the specimen holder, comprising capturing a component of the illumination radiation reflected by the specimen holder by means of a detector, ascertaining measurement values of the captured illumination radiation, establishing a current actual manner of positioning of the specimen holder in relation to the beam path depending on the measurement values, comparing the established actual manner of positioning to an intended manner of positioning, and producing control commands for modifying the actual manner of positioning, the execution of which causes the specimen holder to be moved into the intended manner of positioning, wherein the illumination radiation is directed in the form of a light sheet onto the specimen holder, and further comprising using a microscope embodied as an inverted microscope, having an illumination objective with a first optical axis, embodied to produce a light sheet by means of the illumination radiation, wherein the light sheet is produced or producible, at least in part, in a specimen plane that is spanned by an X-axis and a Y-axis orthogonal to the X-axis, and a detection objective with a second optical axis, embodied to detect light coming from the specimen plane, wherein the illumination objective and the detection objective are aligned relative to one another and relative to the specimen plane in such a way that the first optical axis and the second optical axis intersect in the specimen plane and include a substantially right angle therebetween, and the first optical axis and the second optical axis each include an angle that differs from zero with a third axis that is directed orthogonally to the specimen plane in the direction of a Z-axis and that serves as a reference axis, wherein, in a first step, the specimen holder, which has a base, transparent to the illumination radiation, with a first side face and second side face, is displaced in the direction of the Z-axis until the component of the illumination radiation reflected by the first side face of the base is captured and the relative position of the specimen holder and of the detector in relation to one another is modified in such a way that an actual relative position of the captured component approximates an intended relative position on the detector, and in a second step, wherein the presence of a tilt of the first side face of the base about the Y-axis is checked by virtue of establishing an angle deviation of the actual relative position from the intended relative position, and an occurrence of a deviation of the intended position from the actual position in the direction of the Z-axis is checked and the first step is repeated if an inadmissible deviation occurs.

2. The method as claimed in claim 1, wherein the illumination radiation is a radiation with self-reconstructing rays.

3. The method as claimed in claim 1, wherein the illumination radiation is directed in the form of a Gaussian beam, a Bessel beam, coherent Bessel beam, a sectioned Bessel beam, a $sinc^3$ beam, a lattice light sheet, an Airy beam, or a Mathieu beam onto the specimen holder.

4. The method as claimed in claim 1, wherein the light sheet is produced with illumination radiation of a wavelength that differs from the wavelength of an illumination radiation used for the imaging.

5. The method as claimed in claim 1, in a third step, wherein an alignment of the first side face in the direction of the Y-axis is checked by virtue of the specimen holder being displaced in the direction of the Y-axis and a deviation from the direction of the Y-axis being determined by a migration of the captured reflected component on the detector, and the specimen holder is rotated about the X-axis until migration no longer occurs, should migration occur.

6. The method as claimed in claim 1, wherein, in said second step the specimen holder is rotated about the Y-axis until the angle deviation is minimized should an angle deviation that is greater than an admissible angle deviation be determined, and an occurrence of a deviation of the intended position from the actual position in the direction of the Z-axis is checked and the first step is repeated if an inadmissible deviation occurs.

7. The method as claimed in claim 6, in a third step, wherein an alignment of the first side face in the direction of the Y-axis is checked by virtue of the specimen holder being displaced in the direction of the Y-axis and a deviation from the direction of the Y-axis being determined by a migration of the captured reflected component on the detector, and the specimen holder is rotated about the X-axis until migration no longer occurs, should migration occur.

8. The method as claimed in claim 6, wherein in said first step the adjusted specimen holder is displaced in the direction of the Z-axis along a displacement path from an actual position, in which a component reflected from the first side face or from the second side face is captured by the detector in an intended relative position, until a reflected component of the respective other side face is captured in the intended relative position, and a distance between a first and a second side face in the direction of the Z-axis is established depending on the traversed displacement path in the direction of the Z-axis.

* * * * *

UNITED STATES PATENT AND TRADEMARK OFFICE
CERTIFICATE OF CORRECTION

PATENT NO. : 11,300,770 B2
APPLICATION NO. : 16/312517
DATED : April 12, 2022
INVENTOR(S) : Jörg Siebenmorgen and Thomas Kalkbrenner It is certified that error appears in the above-identified patent and that said Letters Patent is hereby corrected as shown below:

In the Specification

Column 3, Line 44    now reads: "to angle ɑnd distance."
should read -- to angle and distance --

Column 12, Line 60    now reads: "The thickness d is calculated from d′ *))tan(60°/tan(48°."
should read -- The thickness d is calculated from d′ * tan(60°)/tan(48°). --

Signed and Sealed this
Seventh Day of June, 2022

Katherine Kelly Vidal
*Director of the United States Patent and Trademark Office*